(12) United States Patent
Nakashima

(10) Patent No.: US 8,684,116 B2
(45) Date of Patent: Apr. 1, 2014

(54) CONSTRUCTION MACHINE PROVIDED WITH ENGINE ROOM

(75) Inventor: Hajime Nakashima, Hiroshima (JP)

(73) Assignee: Kobelco Construction Machinery Co., Ltd., Hiroshima-shi (JP)

( * ) Notice: Subject to any disclaimer, the term of this patent is extended or adjusted under 35 U.S.C. 154(b) by 490 days.

(21) Appl. No.: 13/030,336

(22) Filed: Feb. 18, 2011

(65) Prior Publication Data

US 2011/0214931 A1 Sep. 8, 2011

(30) Foreign Application Priority Data

Mar. 8, 2010 (JP) ................................. 2010-050088

(51) Int. Cl.
*B60K 11/06* (2006.01)
*B60K 11/08* (2006.01)

(52) U.S. Cl.
USPC ......................................................... 180/68.1

(58) Field of Classification Search
CPC .......... B60K 11/04; B60K 11/06; B60K 11/08
USPC .............................. 180/68.1, 68.2; 123/41.49
See application file for complete search history.

(56) References Cited

U.S. PATENT DOCUMENTS

| 4,180,130 | A | * | 12/1979 | Beck et al. | 165/124 |
| 4,339,014 | A | * | 7/1982 | Berth et al. | 180/68.1 |
| 4,382,481 | A | * | 5/1983 | Moore | 180/68.1 |
| 4,606,422 | A | * | 8/1986 | Jewett | 180/68.1 |
| 5,174,406 | A | * | 12/1992 | Lee | 180/68.2 |
| 5,590,624 | A | * | 1/1997 | Emond et al. | 123/41.49 |

(Continued)

FOREIGN PATENT DOCUMENTS

| CN | 1664255 A | 9/2005 |
| DE | 101 00 326 A1 | 7/2001 |

(Continued)

OTHER PUBLICATIONS

Extended European Search Report issued Jul. 12, 2011, in European Patent Application No. 11156359.9.

(Continued)

*Primary Examiner* — Hau Phan
*Assistant Examiner* — Jacob Meyer
(74) *Attorney, Agent, or Firm* — Oblon, Spivak, McClelland, Maier & Neustadt, L.L.P.

(57) ABSTRACT

Disclosed is a construction machine comprising an engine room having first and second exhaust ports, preventing deterioration of air flows due to collision of exhaust airs through the first and the second exhaust ports, and reducing noise transmission on lateral sides of the construction machine. The construction machine comprises an engine guard surrounding an engine room; an engine, a heat exchanger, and a cooling fan, which are installed in the engine room; and an exhaust air guide. The engine guard is formed with exhaust ports including the first and second exhaust ports. The first is opened in parallel to an axial direction of an engine output shaft. The second is formed in proximity to the first exhaust port downstream of the first exhaust port with respect to a direction parallel to the axial direction of the engine output shaft and opened upward below the first exhaust port. The exhaust air guide has a shape to change a flow direction of the air discharged through the first exhaust port in parallel to the axial direction of the engine output shaft into an upward direction at a position upstream of the second exhaust port.

5 Claims, 4 Drawing Sheets

(56) References Cited

U.S. PATENT DOCUMENTS

| | | | |
|---|---|---|---|
| 5,709,175 A * | 1/1998 | Carroll | 123/41.49 |
| 5,816,350 A * | 10/1998 | Akira et al. | 180/68.1 |
| 5,816,351 A * | 10/1998 | Akira et al. | 180/68.1 |
| 5,839,397 A * | 11/1998 | Funabashi et al. | 123/41.01 |
| 5,884,589 A * | 3/1999 | Sakamoto et al. | 123/41.49 |
| 6,302,066 B1 * | 10/2001 | Steinmann | 123/41.49 |
| 6,302,228 B1 * | 10/2001 | Cottereau et al. | 180/68.1 |
| 6,622,668 B2 * | 9/2003 | Izumi | 123/41.49 |
| 6,745,860 B2 * | 6/2004 | Yabe | 180/68.1 |
| 7,131,422 B2 * | 11/2006 | Kimura et al. | 123/198 E |
| 7,134,518 B2 * | 11/2006 | Arai et al. | 180/68.1 |
| 7,451,843 B2 * | 11/2008 | Nakashima et al. | 180/68.1 |
| 7,559,295 B2 * | 7/2009 | Yamada et al. | 123/41.31 |
| 7,841,314 B2 * | 11/2010 | Nakashima et al. | 123/198 E |
| 8,196,555 B2 * | 6/2012 | Ikeda et al. | 123/41.49 |
| 2001/0007292 A1 * | 7/2001 | Yabf | 180/68.1 |
| 2002/0189874 A1 * | 12/2002 | Sato et al. | 180/65.8 |
| 2005/0188926 A1 * | 9/2005 | Kimura et al. | 123/41.7 |
| 2006/0144350 A1 * | 7/2006 | Nakashima et al. | 123/41.01 |
| 2008/0041332 A1 * | 2/2008 | Sakitani et al. | 123/198 E |
| 2008/0169142 A1 * | 7/2008 | Kinoshita et al. | 180/68.1 |
| 2008/0223319 A1 * | 9/2008 | Nakashima et al. | 123/41.66 |
| 2009/0139786 A1 * | 6/2009 | Lee | 180/68.1 |
| 2010/0219008 A1 * | 9/2010 | Isaka et al. | 180/68.1 |
| 2013/0081887 A1 * | 4/2013 | Tsuchihashi et al. | 180/68.1 |

FOREIGN PATENT DOCUMENTS

| | | |
|---|---|---|
| EP | 0 734 897 A2 | 10/1996 |
| EP | 0 734 897 A3 | 10/1996 |
| EP | 1 630 379 A1 | 3/2006 |
| JP | 54-167927 U | 11/1979 |
| JP | 2004-352089 | 12/2004 |
| JP | 2004-353539 | 12/2004 |
| JP | 2008-8257 | 1/2008 |
| WO | WO 2009/104592 A1 | 8/2009 |

OTHER PUBLICATIONS

Combined Chinese Office Action and Search Report Issued Apr. 11, 2013 in Patent Application No. 201110063223.9 (with English translation and English translation of Categories of Cited Documents).

* cited by examiner

BACKGROUND ART

BACKGROUND ART

CONSTRUCTION MACHINE PROVIDED WITH ENGINE ROOM

BACKGROUND OF THE INVENTION

1. Field of the Invention

The present invention relates to a construction machine, such as a hydraulic shovel, provided with an engine room.

2. Description of the Background Art

Conventionally, there has been known a hydraulic shovel, as a construction machine provided with an engine room, as disclosed in Japanese Unexamined Patent Publication No. 2004-353539 or Japanese Unexamined Patent Publication No. 2008-8257. FIG. 8 shows an overall construction of a general hydraulic shovel, and FIG. 9 shows an example of disposition of various devices provided in an engine room of the hydraulic shovel.

The hydraulic shovel shown in FIG. 8 includes a base carrier 1 having right and left crawlers, an upper slewing structure 2 to be loaded on the base carrier 1 to be slewed around an axis perpendicular to the ground, and a working attachment 3 to be attached to the upper slewing structure 2. An engine guard 4 is provided at a rear part of the upper slewing structure 2, surrounding an engine room 5.

As shown in FIG. 9, the engine room 5 is internally provided with an engine 6, a heat exchanger 7 such as a radiator, a cooling fan 8, a hydraulic pump 9, an exhaust muffler 10, and unillustrated engine-related devices. The heat exchanger 7 and the cooling fan 8 are disposed on one side of the engine 6 side by side (right and left directions when viewed from the rear side of the construction machine: the definition is the same for the following description). The hydraulic pump 9 is disposed on the other side of the engine 6, and the exhaust muffler 10 is disposed above the hydraulic pump 9 at a position higher than the engine 6.

The engine guard 4 includes an upper side wall portion, which is comprised of right and left fixed hoods 12 and 13, a bonnet 11, and other panel members. The fixed hoods 12 and 13 are spaced in right and left directions, positioned at opposite sides of an opening formed in a center region of the engine guard 4. The bonnet 11 is provided so as to open/close the opening, having a shape of protruding upward beyond the fixed hoods 12 and 13 when closing the opening.

The upper side wall portion of the engine guard 4 is formed with a suction port 14, a first exhaust port 15 and a second exhaust port 16, the exhaust ports 15 and 16 positioned on the opposite side of the suction port 14. The cooling fan 8 is rotated to thereby suck the air outside the engine room 5 into the engine room 5 through the suction port 14, and discharge the air to the outside of the engine room 5 through the first and the second exhaust ports 15 and 16 so as to lead the air to pass through around the heat exchanger 7 and the engine 6. This forms an air flow for cooling the heat exchanger 7, the engine 6, and peripheries thereof.

The suction port 14 is formed in the fixed hood 12, located on the left side in FIG. 9, that is, on the windward side of the cooling fan 8. The first exhaust port 15 is formed below a leeward end of the bonnet 11, opened in a direction parallel to the axial direction, namely, horizontal direction, of an engine output shaft 6a so as to allow the air that has cooled the heat exchanger 7 to be mainly discharged through the first exhaust port 15. The second exhaust port 16 is formed in the leeward-side fixed hood 13 so as to be opened upward on the leeward side of the first exhaust port 15 and at a position lower than the first exhaust port 15, letting the air that has passed around the engine 6 and the hydraulic pump 9 so as to vertically pass through the engine room 5 be discharged through the second exhaust port 16. The exhaust muffler 10 is disposed at a position closer to the second exhaust port 16 than the engine 6.

The engine guard 4 is further provided with a guide member 17. The guide member 17 is attached to the bonnet 11 at a position lower than the bonnet 11 so as to be opened/closed integrally with the bonnet 11, positioned in a horizontal posture on the windward side of the leeward-side fixed hood 13 when the bonnet 11 is closed. The guide member 17 defines an exhaust passage 18 with the bonnet 11 therebetween. The exhaust passage 18 mainly guides the air that has passed through the heat exchanger 7 to the first exhaust port 15.

In the conventional construction machine, however, the first exhaust port 15 and the second exhaust port 16, being formed in proximity to each other on the leeward side of the cooling fan 8 as shown in FIG. 10, cause an exhaust air flowing in a lateral direction through the first exhaust port 15 and an exhaust air flowing upward through the second exhaust port 16 to collide against each other. This may deteriorate the air flows through the first and the second exhaust ports 15 and 16, thus lowering the cooling flow rate and deteriorating the cooling performance. Furthermore, the horizontally opened first exhaust port 15 allows noise e.g. engine sounds to be output through the first exhaust port 15 approximately with no constraints, thus causing noise at lateral sides of the construction machine to be increased.

SUMMARY OF THE INVENTION

An object of the invention is to provide a construction machine provided with an engine room having a first exhaust port and a second exhaust port and being capable of preventing deterioration of air flows resulting from collision of exhaust airs through the first and the second exhaust ports, and reduce noise transmission to the exterior of the engine room.

To achieve the above object, a construction machine according to an aspect of the invention is provided with an engine guard which surrounds an engine room; an engine which is installed in the engine room; a heat exchanger which is installed in the engine room; a cooling fan which is installed in the engine room to suck an air for cooling from an exterior of the construction machine into the engine room; and an exhaust air guide. The engine guard is formed with a plurality of exhaust ports for discharging the air in the engine room to the exterior of the engine room. The exhaust ports include a first exhaust port opened in a direction parallel to an axial direction of an engine output shaft, and a second exhaust port formed in proximity to the first exhaust port on the leeward side of the first exhaust port with respect to the axial direction of the engine output shaft and opened upward at a position lower than the first exhaust port. The exhaust air guide has a shape to change a flow direction of the air discharged through the first exhaust port in the direction parallel to the axial direction of the engine output shaft into an upward direction, at a position on the windward side of the second exhaust port.

The exhaust air guide with the shape prevents collision of an exhaust air through the first exhaust port and an exhaust air through the second exhaust port, thereby making the flows of exhaust airs smooth. This makes it possible to increase the cooling flow rate and enhance the cooling performance. Besides, the change of the flow direction of the exhaust air through the first exhaust port into upward results in a reduction in noise transmission to the exterior of the engine room.

These and other objects, features and advantages of the present invention will become more apparent upon reading the following detailed description along with the accompanying drawings.

DESCRIPTION OF THE PREFERRED EMBODIMENTS

There will be described embodiments of the invention referring to FIGS. 1 through 8. In either of the embodiments, the invention is applied to the hydraulic shovel shown in FIG. 8. Each the embodiment includes elements common to those of the conventional art shown in FIG. 9.

Figure 8:
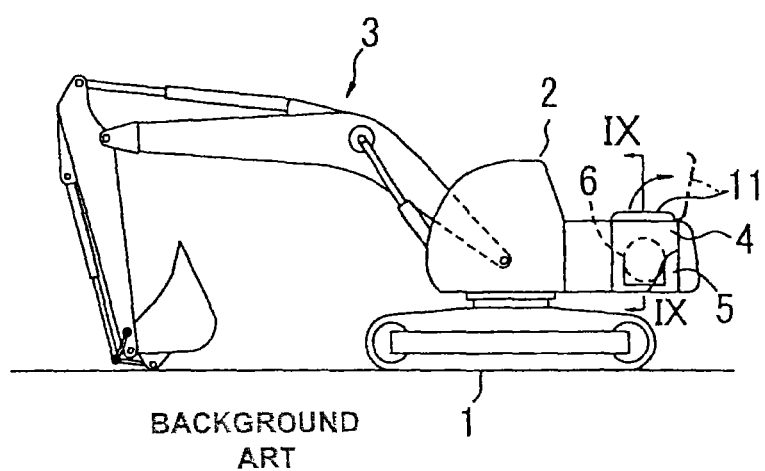
FIG. 8 is a side view schematically showing a hydraulic shovel, as an example of a construction machine embodying the present invention.

Specifically, there is disposed an engine guard 4 surrounding an engine room 5, at a rear part of the upper slewing structure 2 of the hydraulic shovel shown in FIG. 8. In the engine room 5 are installed an engine 6, a heat exchanger 7 such as a radiator, a cooling fan 8, a hydraulic pump 9, an exhaust muffler 10, and unillustrated engine-related devices. The heat exchanger 7 and the cooling fan 8 are disposed on one side of the engine 6 side by side (right and left directions when viewed from the rear side of the construction machine, the definition is the same for the following description); the hydraulic pump 9 is disposed on the other side of the engine 6; and the exhaust muffler 10 is disposed above the hydraulic pump 9.

The engine guard 4 includes an upper side wall portion, which is constituted by right and left fixed hoods 12 and 13, a bonnet 11, and other panel members. The fixed hoods 12 and 13 are spaced in right and left directions, letting an opening in a center region of the engine guard 4 be interposed therebetween. The bonnet 11 is so provided as to open/close the opening, and has a shape of protruding upwardly beyond the fixed hoods 12 and 13 when closing the opening.

The upper side wall portion of the engine guard 4 is formed with a suction port 14, a first exhaust port 15 and a second exhaust port 16, the exhaust ports 15 and 16 positioned on the opposite side of the suction port 14. The rotation of the cooling fan 8 sucks the air outside the engine room 5 into the engine room 5 through the suction port 14; the air passes through the surroundings of the heat exchanger 7 and the engine 6 and thereafter discharged through the first and the second exhaust ports 15 and 16. This air flow cools the heat exchanger 7, the engine 6, and peripheries thereof.

Figure 9:
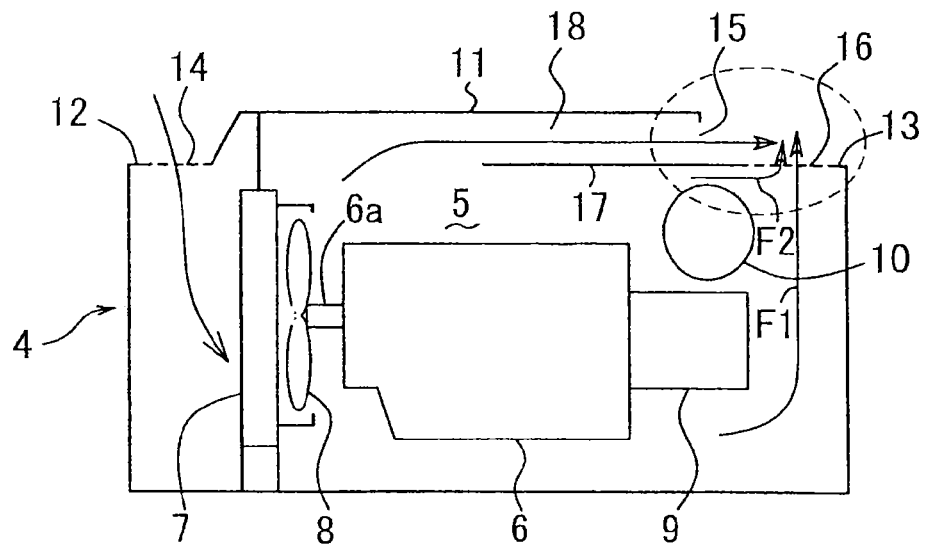
FIG. 9 is an enlarged sectional view taken along the line IX-IX in FIG. 8.
Figure 10:
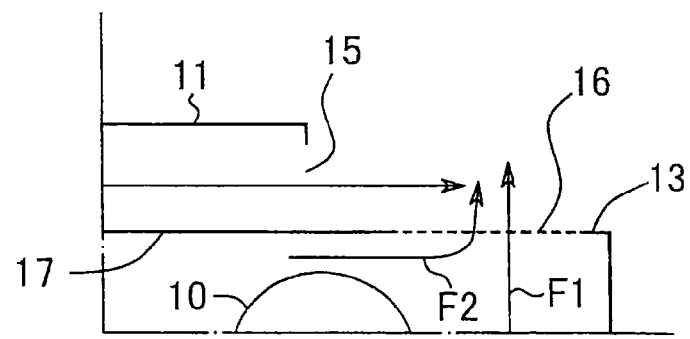
FIG. 10 is a diagram enlargedly showing a portion surrounded by the broken line in FIG. 9.

The suction port 14 is formed in the fixed hood 12 so as to be located on the left side in FIG. 9, that is, on the windward side of the cooling fan 8. The first exhaust port 15 is formed below a leeward end of the bonnet 11 and is opened in a direction parallel to the axial direction (horizontal direction) of an engine output shaft 6a, thus letting the air that has cooled the heat exchanger 7 be mainly discharged through the first exhaust port 15. The second exhaust port 16 is formed in the leeward-side fixed hood 13 so as to be opened upward on the leeward side of the first exhaust port 15 with respect to a direction parallel to the axial direction of the engine output shaft 6a and at a position lower than the first exhaust port 15. The second exhaust port 16 lets the air that has passed through the surroundings of the engine 6 and the hydraulic pump 9 so as to vertically pass through the engine room 5 be discharged through the second exhaust port 16.

Furthermore, the hydraulic shovel according to the embodiment of the invention is, as the feature thereof, provided with an exhaust air guide 19 for changing the flow direction of a first exhaust air through the first exhaust port 15 into upward direction (in FIG. 1, obliquely upward) on the windward side of the second exhaust port 16. The details of the exhaust air guide 19 will be described as follows.

Figure 1:
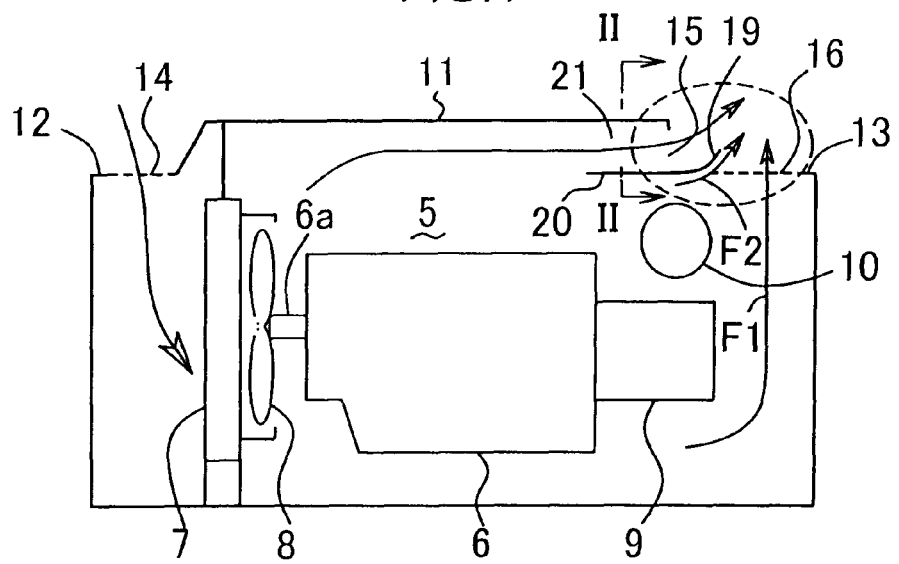
FIG. 1 is a schematic sectional view showing an engine guard and an arrangement of various devices in an engine room which the engine guard surrounds according to an embodiment of the invention.
Figure 2:
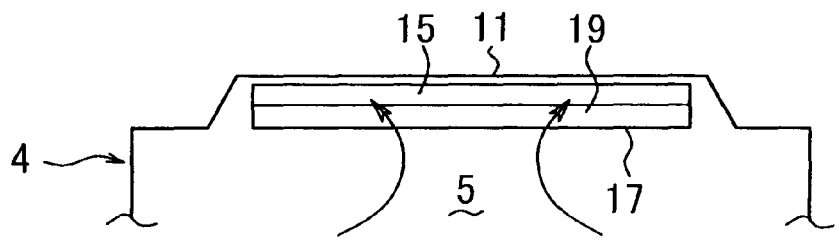
FIG. 2 is an enlarged sectional view taken along the line II-II in FIG. 1.
Figure 3:
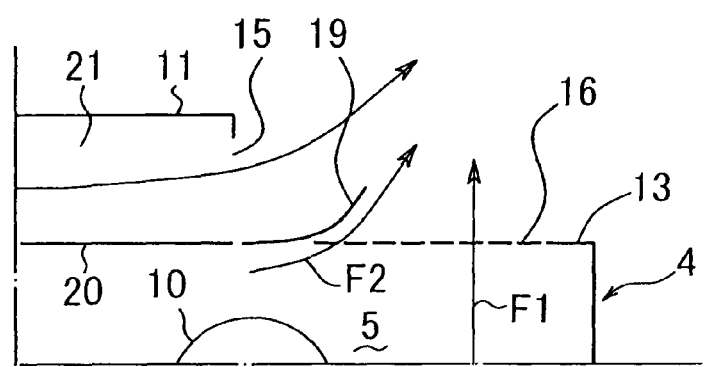
FIG. 3 is a diagram enlargedly showing a portion surrounded by the broken line in FIG. 1.

The exhaust air guide 19 shown in FIGS. 1 through 3 rises obliquely upward, from a periphery of the first exhaust port 15 on the windward side of the second exhaust port 16, toward the leeward side, while being gradually curved in such a manner that the up grade of the exhaust air guide 19 is increased with the approach toward the leeward side. This means that the exhaust air guide 19 has such a shape as to change the flow direction of the exhaust air through the first exhaust port 15 obliquely into an upward direction in a region between the first exhaust port 15 and the second exhaust port 16 downstream of the first exhaust port 15.

The exhaust air guide 19 thus produces the following effects.

(i) The exhaust air guide 19 prevents the exhaust air through the first exhaust port 15 and the exhaust air through the second exhaust port 16 from colliding against each other from different directions at an approximately right angle, unlike the conventional art, and allows the first exhaust air and the second exhaust air to be smoothly merged to each other as an upward air flow, thereby making both of the exhaust airs smooth to increase the cooling flow rate and enhance the cooling performance.

(ii) The exhaust air guide 19 changes the direction not only of the flow of the exhaust gas from the first exhaust port 15 but also of sounds output from the first exhaust port 15, from a horizontal direction into an obliquely upward one, thereby remarkably reducing noise transmission to the exterior of the engine room 5.

(iii) The exhaust air guide 19 can also weaken a collision between the flows in the engine room 5. As shown in FIG. 1, as air flows from the interior of the engine room 5 toward the second exhaust port 16, there are a first air flow F1 directing upward in generally vertical direction from a lower part inside the engine room 5 toward the second exhaust port 16 and a second air flow F2 in a direction parallel to the engine output shaft at an upper part inside the engine room 5, the flow F2 deflected thereafter upward toward the second exhaust port 16. The lower surface of the exhaust air guide 19 can guide the second air flow F2 obliquely upward at a position upstream of the second exhaust port 16 to thereby weaken a collision between the second air flow F2 and the first air flow F1. This also enables the cooling flow rate to be increased.

The hydraulic shovel of the embodiment is provided with a guide member 20, in addition to the exhaust air guide 19. The guide member 20 is disposed at an upper part inside the engine room 5, and is horizontally continued to a windward end of the exhaust air guide 19, thereby defining an exhaust air passage 21 in cooperation with the bonnet 11 for guiding the air inside the engine room 5 to the first exhaust port 15.

The guide member 20 has a relatively short length just enough to cover the exhaust muffler 10 and the hydraulic pump 9 from above. Besides, as shown in FIG. 3, the guide member 20 is formed as a member independently of the exhaust air guide 19 and is connected to the bonnet 11 to integrally move with the bonnet 11 in a direction of opening/closing the engine room 5, so as to allow a person to easily perform maintenance inside the engine room 5. The invention, however, is not limited to the above. In the case where the guide member 20 has a relatively short length and is less likely to obstruct maintenance, the guide member 20 may be integrally formed with the exhaust air guide 19.

Figure 4:
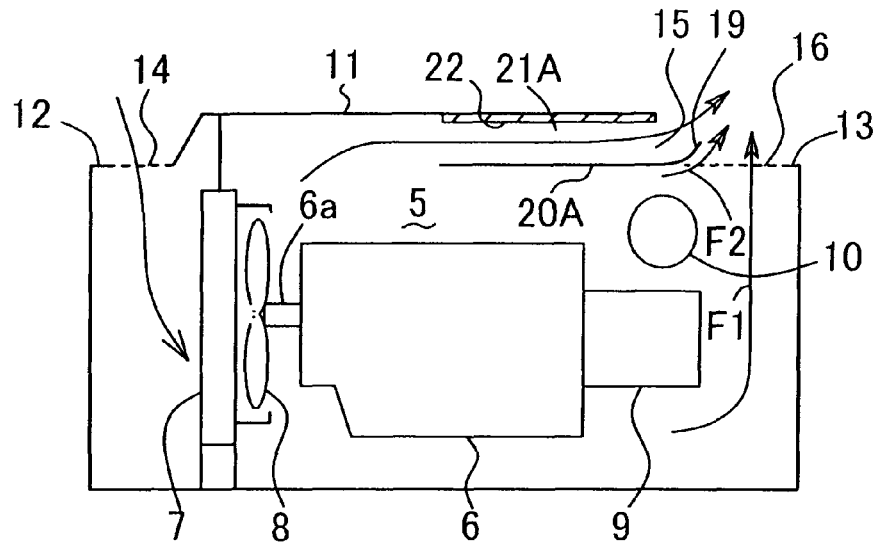
FIG. 4 is a schematic sectional view showing a modification of a structure of the engine guard.

The present invention is not limited to the length of the guide member. FIG. 4 shows a guide member 20A, which is long enough to cover a leeward half portion of the engine 6 from above. The guide member 20A is able to define an exhaust air passage 21A longer than the exhaust air passage 21 shown in FIG. 1. Furthermore, it is also possible to provide a sound absorber 22 on the wall surface (the lower surface of the bonnet 11 in FIG. 4) surrounding the exhaust air passage 21A. Alternatively, the sound absorber 22 may be provided on the upper surface of the guide member 20A.

The long exhaust air passage 21A as described above is capable of an excellent guide performance, which is a performance of guiding the air inside the engine room 5 to the first exhaust port 15, enabling the air discharge to be smoother. Furthermore, the exhaust air passage 21A, positioned above the engine 6, can suppress transmission of engine sounds to the exterior of the engine room 5. Besides, the sound absorber 22, formed on the wall surface of the engine guard 4 surrounding the exhaust air passage 21A, can give the exhaust air passage 21A a function as a sound absorbing duct, thus promoting a reduction in the noise transmission. The sound absorber 22 can also be applied to the structure shown in FIGS. 5 through 7 to be described later.

Figure 5:
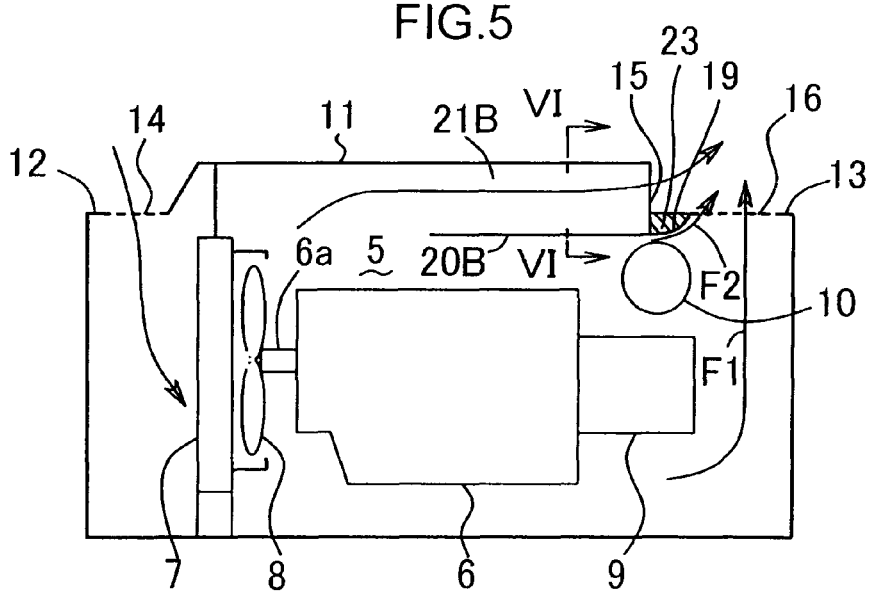
FIG. 5 is a schematic sectional view showing a modification of a structure of the engine guard.
Figure 6:
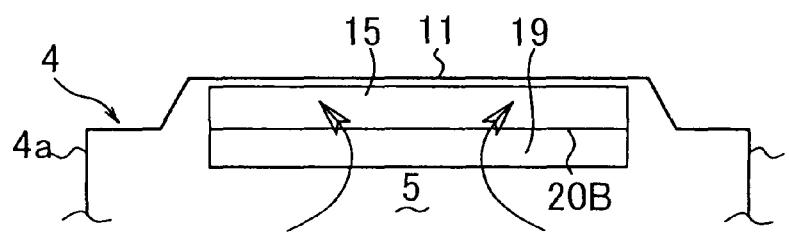
FIG. 6 is an enlarged sectional view taken along the line VI-VI in FIG. 5

The engine guard 4 shown in FIGS. 5 and 6 is provided with a guide member 20B at a position lower than the fixed hood 13, in place of the guide member 20A shown in FIG. 4; the exhaust air guide 19 rises from the guide member 20B so as to interconnect the guide member 20B and the fixed hood 13. There is a space above the exhaust air guide 19 and immediately downstream (on the right side in FIG. 5) of the first exhaust port 15, the space being interposed between right and left side walls 23 as shown by the hatched portion in FIG. 5, in the width direction of the exhaust air guide 19, that is, in a direction perpendicular to the direction in which the exhaust air guide 19 guides the air (the depth direction of FIG. 5). The walls 23 are advantageous in reducing noise transmission to the exterior of the engine room 5 through the first exhaust port 15.

Figure 7:
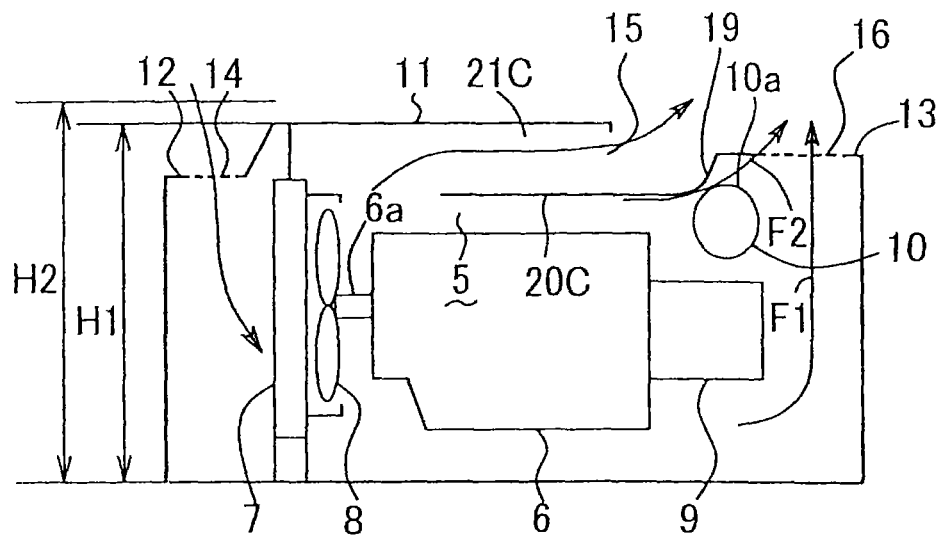
FIG. 7 is a schematic sectional view showing another modification of a structure of the engine guard.

FIG. 7 shows an engine guard 4 which has a guide member 20C disposed at a position lower than an upper end 10a of an exhaust muffler 10. This engine guard 4 also allows the exhaust air guide 19 to rise from a leeward end (end portion on the exterior of the first exhaust port 15) of the guide member 20C to a leeward-side fixed hood 13. The guide member 20C thus positioned at a position lower than the upper end 10a of the exhaust muffler 10 makes it possible to lower a bonnet 11, in other words, to let the height H of the engine guard 4 low, without decreasing the height of an exhaust air passage 21C defined between the guide member 20C and the bonnet 11. This gives the operator a good rear view.

The present invention is not limited to the specific shape of the exhaust air guide. The exhaust air guide may have a shape, for example, of rising approximately vertically (preferably, with a certain radius of curvature) from the guide member 20 shown in FIG. 1.

Besides, the present invention is not limited to a hydraulic shovel, but may be applied to a construction machine of another kind provided with an engine room.

As described herein, the invention provides a construction machine which comprises an engine room having a first exhaust port and a second exhaust port, in which machine deterioration of air flows due to the collision of the exhaust airs through the first and the second exhaust ports can be prevented and noise transmission on lateral sides of the construction machine can be reduced.

Specifically, the construction machine according to the invention includes an engine guard which surrounds an engine room; an engine which is installed in the engine room; a heat exchanger which is installed in the engine room; a cooling fan which is installed in the engine room and adapted to suck an air for cooling from an exterior of the construction machine into the engine room; and an exhaust air guide. The engine guard is formed with a plurality of exhaust ports for discharging the air in the engine room to the exterior of the engine room. The exhaust ports include a first exhaust port which is opened in a direction parallel to an axial direction of an engine output shaft, and a second exhaust port which is formed in proximity to the first exhaust port on the leeward side of the first exhaust port with respect to a direction parallel to the axial direction of the engine output shaft and is opened upward at a position lower than the first exhaust port. The exhaust air guide has a shape to change a flow direction of the air discharged through the first exhaust port in the direction parallel to the axial direction of the engine output shaft into an upward direction, at a position on the windward side of the second exhaust port.

The change of the flow direction prevents the exhaust air through the first exhaust port and the exhaust air through the second exhaust port from collusion with each other, thereby making the flows of exhaust airs smooth. This allows the cooling flow rate to be increased and allows the cooling performance to be enhanced. Furthermore, the change of the flow direction of the exhaust air through the first exhaust port into an upward direction results in a lowered noise transmission to the exterior of the engine room.

For instance, the exhaust air guide preferably has a shape of rising obliquely upward toward the leeward side so as to change the flow direction of the air discharged through the first exhaust port into an obliquely upward direction. This shape enhances the effect of reducing noise transmission to the exterior of the engine room.

Besides, the exhaust air guide, if having a lower surface configured to guide the air flowing in the direction parallel to the engine output shaft in the engine room and discharged through the second exhaust port obliquely upward at a position upstream of the second exhaust port, can also reduce the resistance of an exhaust air through the second exhaust port by utilization of the exhaust air guide to thereby allow the cooling flow rate to be increased. For instance, in the engine room of the conventional art shown in FIG. 9, there exist the air flow F1 that rises generally vertically from the lower part inside the engine room 5 toward the second exhaust port 16 and the air flow F2 that flows in a direction parallel to the engine output shaft at an upper part inside the engine room 5 and is deflected upward at a position anterior to the second exhaust port 16, and the air flows F1 and F2 may lower the cooling flow rate if making collusion with each other at the second exhaust port 16; however, the exhaust air guide having a lower surface for guiding the air flow F2 obliquely upward as described above can weaken the collision between the air flows F1 and F2, thus contributing an increased cooling flow rate.

Furthermore, the engine guard of the inventive construction machine may preferably include an upper side outer wall such as a bonnet, and a guide member which is continued to a windward end of the exhaust air guide at a position lower than the upper side outer wall to thereby define an exhaust air passage in cooperation with the upper side outer wall, the exhaust air passage guiding the air in the engine room to the first exhaust port. This exhaust air passage allows an air to be smoothly discharged to the exterior of the engine room. Moreover, in the arrangement further including a sound absorber which is provided on a surface of the engine guard surrounding the exhaust air passage, e.g. a lower surface of the upper side outer wall or an upper surface of the guide member, the sound absorber enables the air exhaust passage to function as a sound absorbing duct to contribute to noise reduction.

The present invention permits the relative height position between the second exhaust port and the exhaust air guide to be properly set. For instance, it may be permitted that the exhaust air guide rises toward the leeward side from a position on the leeward side of the first exhaust port and lower than the second exhaust port and the engine guard includes side walls positioned on opposite sides of a space above the exhaust air guide in a width direction of the engine guard: the side walls can reduce noise transmission through the first exhaust port. Furthermore, as to a construction machine further including an exhaust muffler disposed at a position higher than the engine in the engine room and closer to the second exhaust port than the engine, the exhaust air guide preferably rises toward the leeward side from a position on the windward side of the exhaust muffler and lower than an upper end of the exhaust muffler. This allows the position of the first exhaust port to be lowered, thus allowing the overall height of the engine room to be reduced to thereby consequently enhance the rear view for the operator.

This application is based on Japanese Patent Application No. 2010-050088 filed on Mar. 8, 2010, the contents of which are hereby incorporated by reference.

Although the present invention has been fully described by way of example with reference to the accompanying drawings, it is to be understood that various changes and modifications will be apparent to those skilled in the art. Therefore, unless otherwise such changes and modifications depart from the scope of the present invention hereinafter defined, they should be construed as being included therein.

What is claimed is:

1. A construction machine provided with an engine room, comprising:
an engine guard which surrounds the engine room and includes an upper side outer wall;
an engine which is installed in the engine room and under the upper side outer wall;
a heat exchanger which is installed in the engine room;
a cooling fan which is installed in the engine room and adapted to suck air for cooling from an exterior of the construction machine into the engine room;
a guide member provided at a position lower than the upper side outer wall to define an exhaust passage between the upper side outer wall and the guide member, the exhaust passage being at a position higher than the engine; and
an exhaust air guide, wherein:
the engine guard is formed with a plurality of exhaust ports for discharging the air in the engine room to the exterior of the construction machine, the exhaust ports including a first exhaust port which is opened in a direction parallel to an axial direction of an engine output shaft, and a second exhaust port which is formed in proximity to the first exhaust port on a leeward side of the first exhaust port with respect to a direction parallel to the axial direction of the engine output shaft, and opened upward at a position lower than the first exhaust port,
the guide member defines the exhaust passage to guide the air to the first exhaust port in the direction parallel to the axial direction of the engine output shaft so as to cause the air to be discharged from the first exhaust port in the direction parallel to the axial direction of the engine output shaft; and
the exhaust air guide is provided between the first exhaust port and the second exhaust port and has a shape of rising obliquely upward and along a direction approaching the second exhaust port to change a flow direction of the air discharged through the first exhaust port from the direction parallel to the axial direction of the engine output shaft into an upward direction, at a position on the windward side of the second exhaust port.

2. The construction machine according to claim 1, wherein the exhaust air guide has a lower surface configured to guide the air flowing in the direction parallel to the engine output shaft in the engine room and discharged through the second exhaust port obliquely upward at a position upstream of the second exhaust port.

3. The construction machine according to claim 1, further comprising a sound absorber which is provided on a surface of the engine guard surrounding the exhaust air passage.

4. The construction machine according to claim 1, wherein the exhaust air guide rises toward the leeward side from a position on the leeward side of the first exhaust port and lower than the second exhaust port, and the engine guard includes side walls positioned on opposite sides of a space above the exhaust air guide in a width direction of the engine guard.

5. The construction machine according to claim 4, further comprising an exhaust muffler which is disposed at a position higher than the engine in the engine room and closer to the second exhaust port than the engine, wherein the exhaust air guide rises toward the leeward side from a position on the windward side of the exhaust muffler and lower than an upper end of the exhaust muffler.

* * * * *